United States Patent
Bender et al.

(10) Patent No.: US 12,081,583 B2
(45) Date of Patent: Sep. 3, 2024

(54) AUTOMATIC RANSOMWARE DETECTION AND MITIGATION

(71) Applicant: International Business Machines Corporation, Armonk, NY (US)

(72) Inventors: Stefan Bender, Woerrstadt (DE); Dominic Mueller-Wicke, Weilburg (DE); Mauro Cruciani, Bodenheim (DE); Christian Mueller, Dichtelbach (DE); Thomas Schreiber, Klein-Winternheim (DE); Frank Mueller, Moerfelden-Walldorf (DE); Kai Boerner, Kelsterbach (DE)

(73) Assignee: International Business Machines Corporation, Armonk, NY (US)

( * ) Notice: Subject to any disclaimer, the term of this patent is extended or adjusted under 35 U.S.C. 154(b) by 446 days.

(21) Appl. No.: 16/854,943

(22) Filed: Apr. 22, 2020

(65) Prior Publication Data

US 2021/0336968 A1 Oct. 28, 2021

(51) Int. Cl.
*H04L 9/40* (2022.01)
*G06F 11/14* (2006.01)

(52) U.S. Cl.
CPC ........ *H04L 63/145* (2013.01); *G06F 11/1451* (2013.01); *G06F 2201/84* (2013.01)

(58) Field of Classification Search
CPC .. G06F 11/1451; G06F 21/562; G06F 21/566; G06F 11/1438; G06F 11/3409; G06F 11/3452; G06F 2201/84; H04L 63/145
USPC ........................................................ 726/23
See application file for complete search history.

(56) References Cited

U.S. PATENT DOCUMENTS

| | | | |
|---|---|---|---|
| 9,514,309 B1* | 12/2016 | Mann ................... | G06F 21/567 |
| 11,307,933 B2* | 4/2022 | Wilson ................. | G06F 11/1448 |
| 2014/0358855 A1* | 12/2014 | Mielenhausen ......... | G06F 16/27 |
| | | | 707/624 |
| 2016/0378988 A1* | 12/2016 | Bhashkar ............... | G06F 21/566 |
| | | | 726/24 |
| 2017/0371750 A1* | 12/2017 | Horowitz .............. | G06F 16/904 |

(Continued)

FOREIGN PATENT DOCUMENTS

EP 3514719 B1 * 4/2021 ............. G06F 21/56

OTHER PUBLICATIONS

Pletinckx, Malware Coordination using the Blockchain: An Analysis of the Cerber Ransomware (Year: 2018).*

*Primary Examiner* — Luu T Pham
*Assistant Examiner* — Saad Ahmad Abdullah
(74) *Attorney, Agent, or Firm* — Stephen R. Yoder

(57) ABSTRACT

A method, computer program product, and system for detecting and mitigating ransomware using snapshot-based backups applied to a block-oriented storage device, by performing the following operations: (i) performing, in predetermined time-intervals, snapshot backups of data in a block-oriented storage device; (ii) determining at least one interval malware index value between a last snapshot backup and a next planned snapshot backup, wherein the interval malware index value is indicative of a changed block rate in stored data of storage blocks of the block-oriented storage device; and (iii) in response to determining that the interval malware index value is larger than a predefined interval malware index threshold value, triggering an emergency snapshot.

19 Claims, 9 Drawing Sheets

(56) References Cited

U.S. PATENT DOCUMENTS

| | | | |
|---|---|---|---|
| 2018/0107824 A1* | 4/2018 | Gibbons, Jr. | ......... G06F 21/565 |
| 2018/0167403 A1* | 6/2018 | Smith | ..................... G06F 21/55 |
| 2018/0211039 A1 | 7/2018 | Tamir | |
| 2019/0109870 A1 | 4/2019 | Bedhapudi | |
| 2019/0227881 A1* | 7/2019 | Patro | ................... G06F 11/1464 |

* cited by examiner

| snapshot name | change rate | average compression | average deduplication | delta change | delta compression | delta deduplication | snapshot malware index |
|---|---|---|---|---|---|---|---|
| Sn_10 | 10% | 2,3 | 3,2 | 0% | -15% | 25% | 0,86 |
| Sn_11 | 8% | 2,5 | 3,1 | -3% | 15% | 5% | 0,79 |
| Sn_12 | 21% | 1,7 | 2,0 | 12% | -70% | -115% | 4,09 |
| Sn_13 | 19% | 1,7 | 2,1 | 5% | -40% | -45% | 2,12 |

Table 1

FIG. 6

| snapshot name | commit | blocks | commit / compress rate | commit / dedup rate | commit / malware index | affected |
|---|---|---|---|---|---|---|
| Sn_10 | #1234 | 1, 2, 3 | 2,3 | 3,2 | -0,01 | NO |
| | #1235 | 4, 5 | 2,6 | 3,1 | -0,22 | NO |
| | #1236 | 6, 8, 10 | 2,4 | 2,9 | 0,19 | NO |
| | #1237 | 17, 18, 22 | 2,0 | 3,5 | -0,01 | NO |
| Sn_11 | #1238 | 23, 25, 40 | 2,5 | 3,1 | -0,06 | NO |
| | #1239 | 24, 26, 27, 28 | 2,7 | 2,8 | 0,04 | NO |
| | #1240 | 30, 31 | 2,3 | 3,4 | -0,16 | NO |
| Sn_12 | #1241 | 11, 12 | 2,4 | 3,1 | -1,87 | NO |
| | #1242 | 8, 10, 13 | 2,3 | 2,8 | -1,47 | NO |
| | #1243 | 1, 2, 3 | 1,1 | 1,0 | 1,53 | YES |
| | #1244 | 33, 34, 35 | 2,0 | 3,0 | -1,37 | NO |
| | #1245 | 44, 45, 48 | 1,0 | 1,0 | 1,63 | YES |
| | #1246 | 30, 31 | 1,1 | 1,0 | 1,53 | YES |
| Sn_13 | #1247 | 7, 49, 52 | 2,3 | 3,0 | -1,57 | NO |
| | #1248 | 4, 5 | 1,0 | 1,1 | 1,63 | YES |
| | #1249 | 23, 25, 40 | 1,2 | 1,0 | 1,53 | YES |
| | #1250 | 55, 56, 57 | 2,1 | 2,9 | -1,27 | NO |
| | #1251 | 58, 59 | 2,4 | 3,2 | -1,87 | NO |
| | #1252 | 17, 18, 22 | 1,1 | 1,1 | 1,53 | YES |

Table 2

FIG. 7

AUTOMATIC RANSOMWARE DETECTION AND MITIGATION

BACKGROUND

The present invention relates generally to the field of ransomware detection and mitigation, and more particularly to ransomware detection and mitigation using snapshot-based backups applied to a block-oriented storage device.

A ransomware attack is one of the most disruptive issues that can happen to enterprise IT organizations and their filesystems. In many cases, ransomware attacks cannot be detected quickly enough to prevent substantial loss of files. Typically, an owner of a filesystem realizes that a ransomware attack has occurred after a substantial portion of the filesystem has already been encrypted.

SUMMARY

According to an aspect of the present invention, there is a method, computer program product and/or system that performs the following operations (not necessarily in the following order): (i) performing, in predetermined time-intervals, snapshot backups of data in a block-oriented storage device; (ii) determining at least one interval malware index value between a last snapshot backup and a next planned snapshot backup, wherein the interval malware index value is indicative of a changed block rate in stored data of storage blocks of the block-oriented storage device; and (iii) in response to determining that the interval malware index value is larger than a predefined interval malware index threshold value, triggering an emergency snapshot.

BRIEF DESCRIPTION OF THE DRAWINGS

It should be noted that embodiments of the invention are described with reference to different subject-matter. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Figure 1:
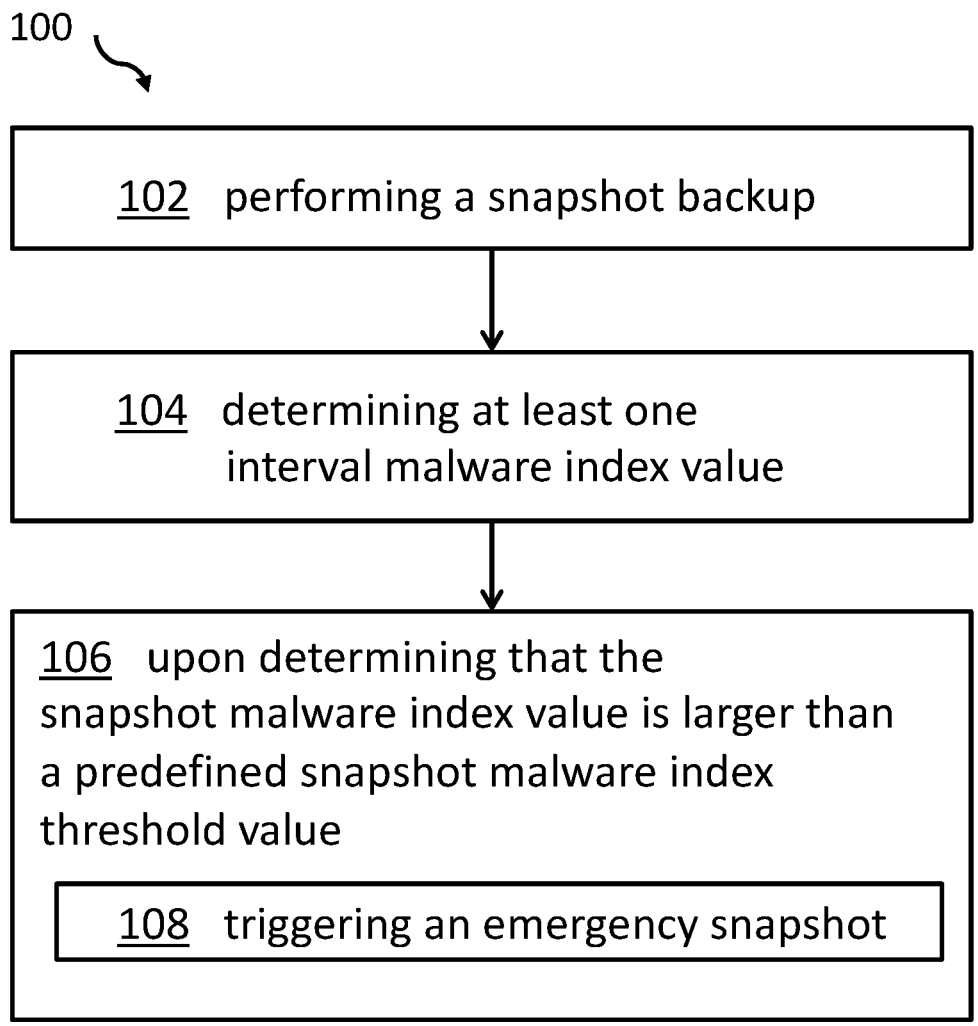
Figure 2:
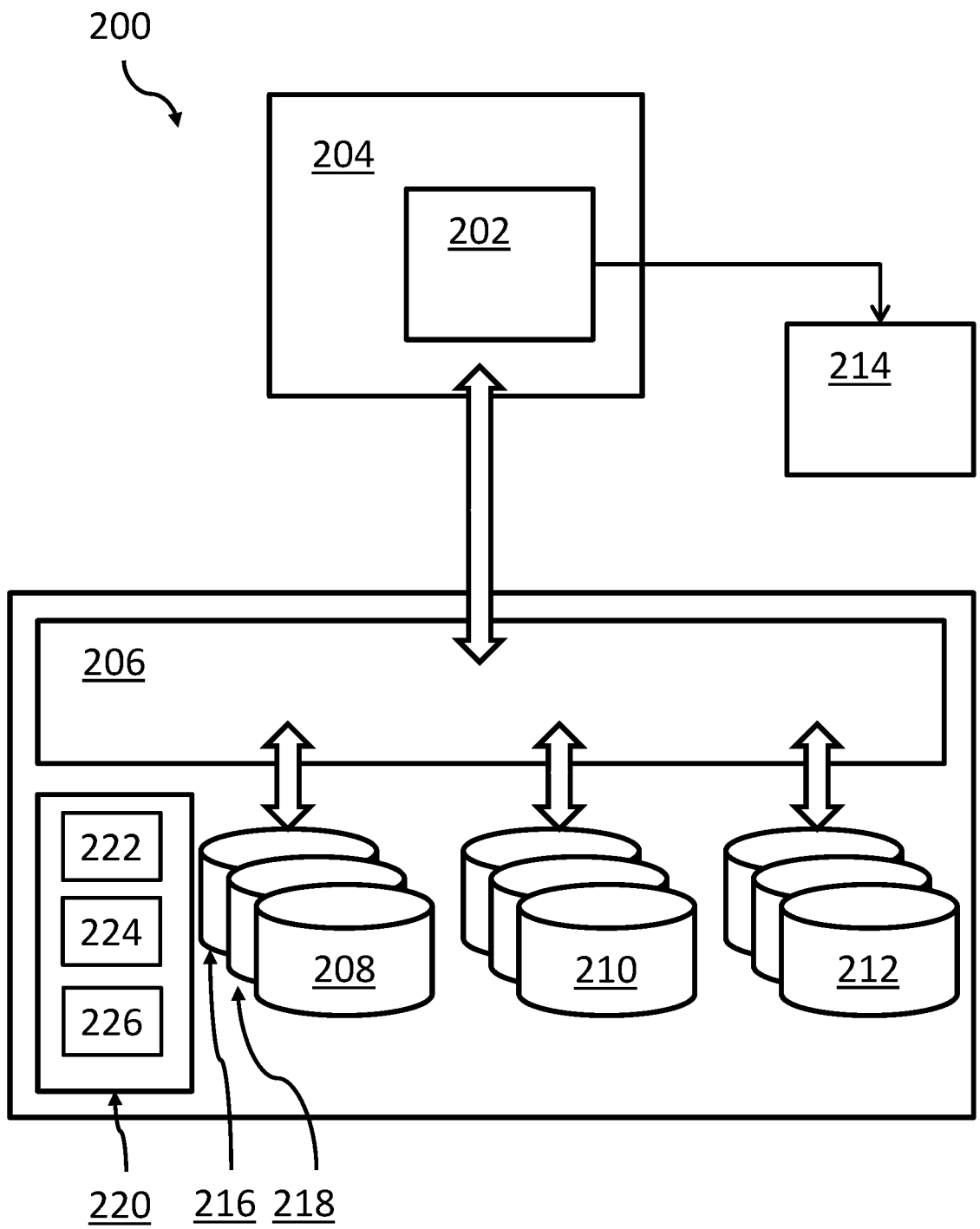
Figure 3:
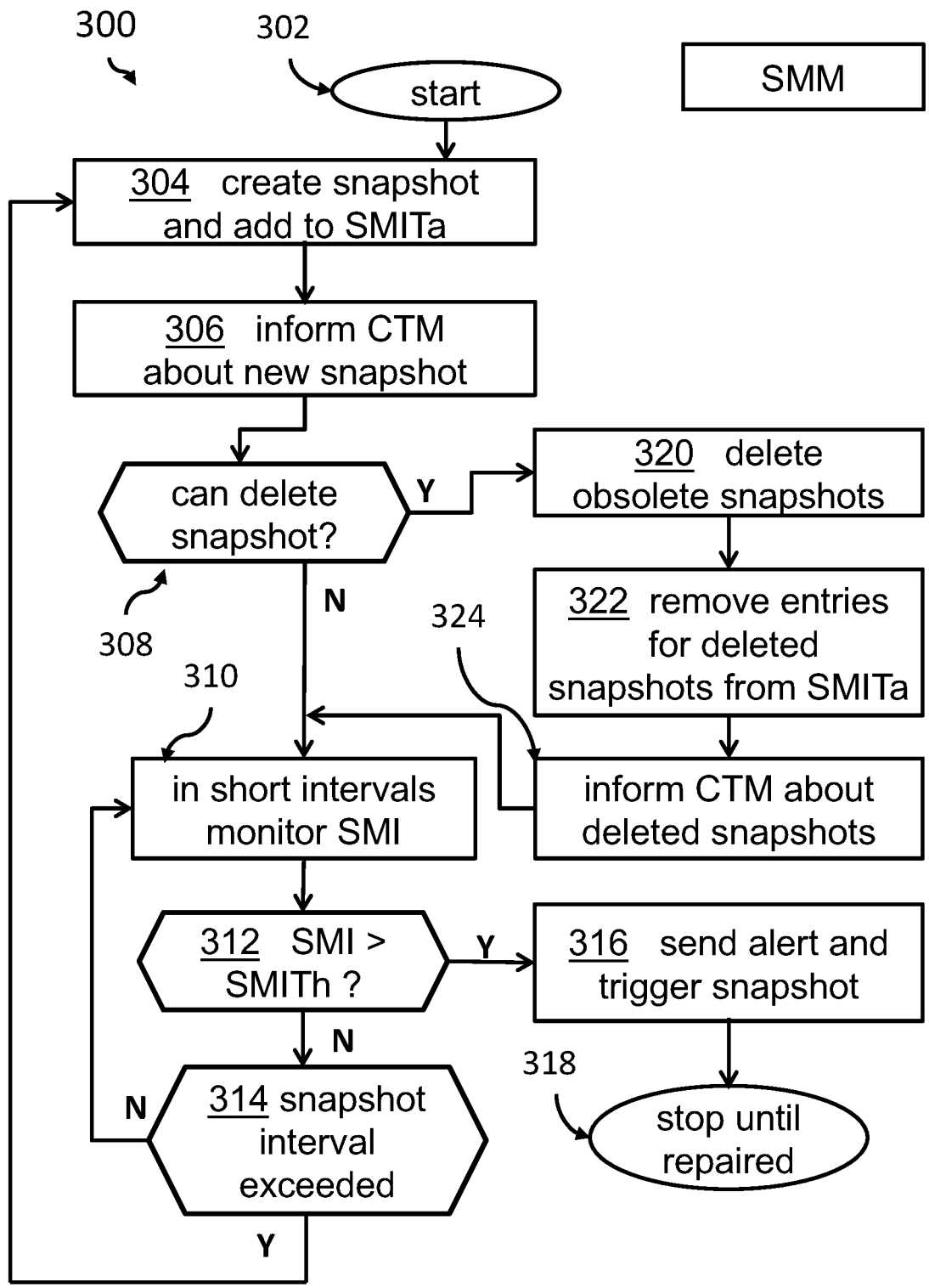
Figure 4:
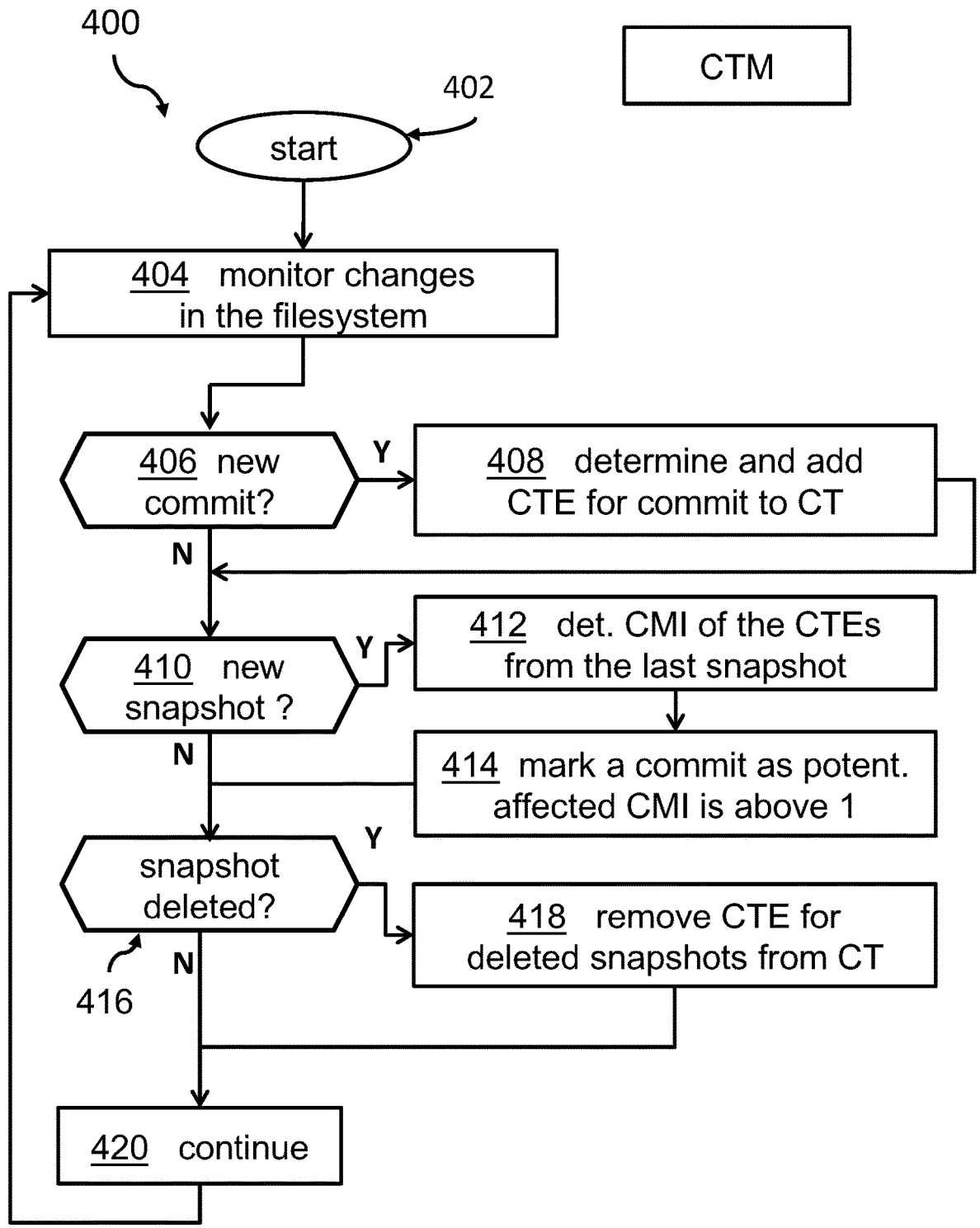
Figure 5:
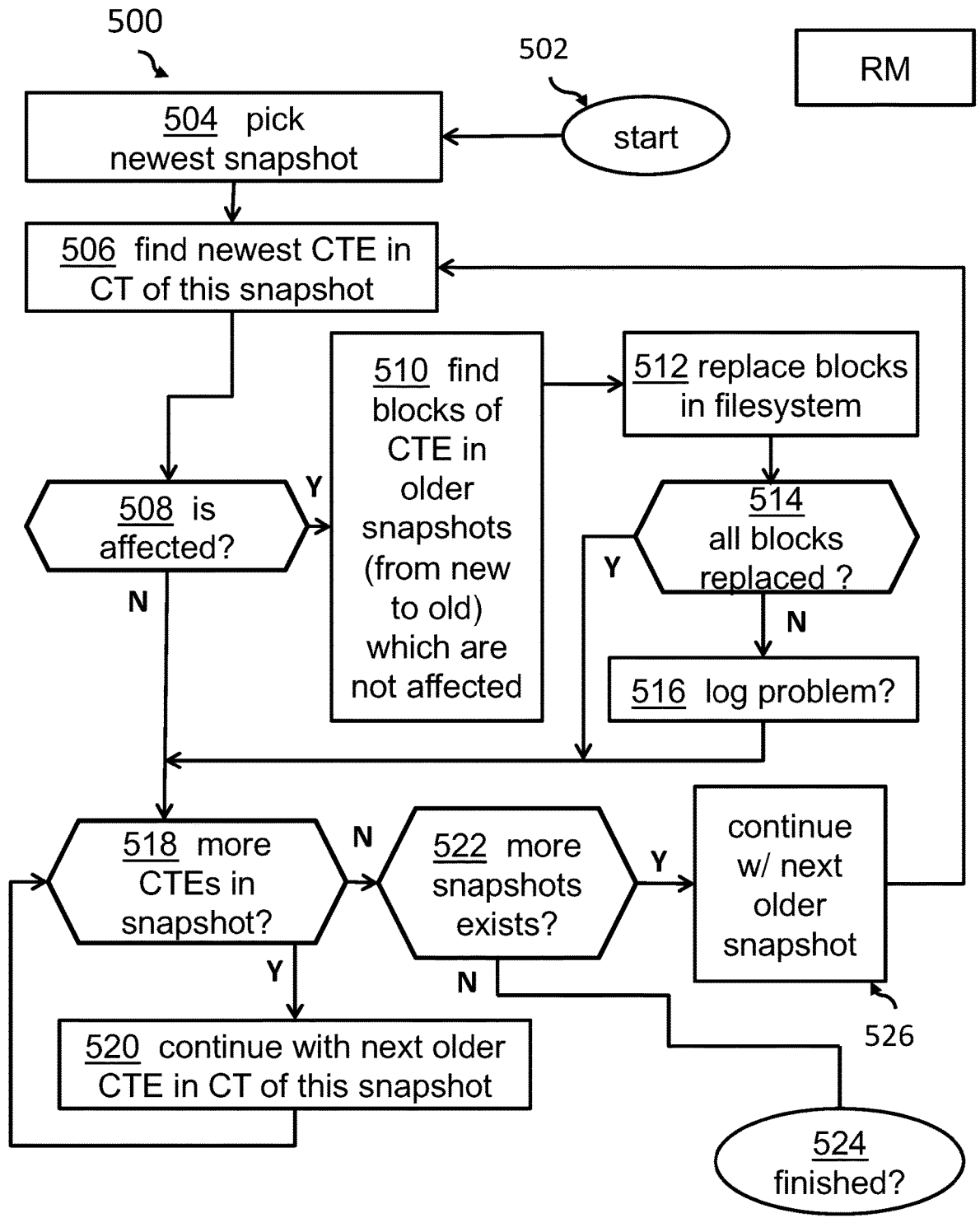
Figure 8:
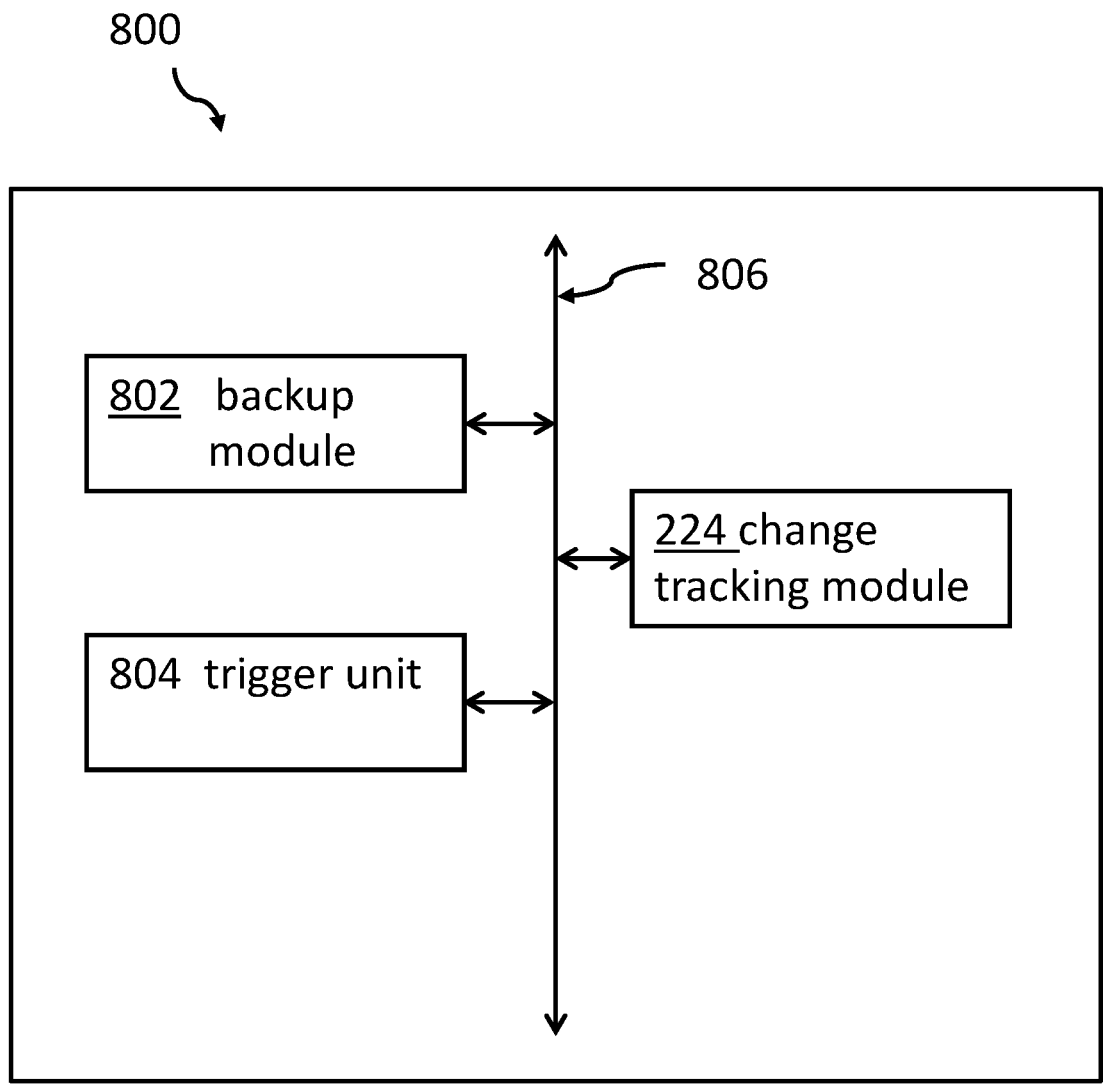
Figure 9:
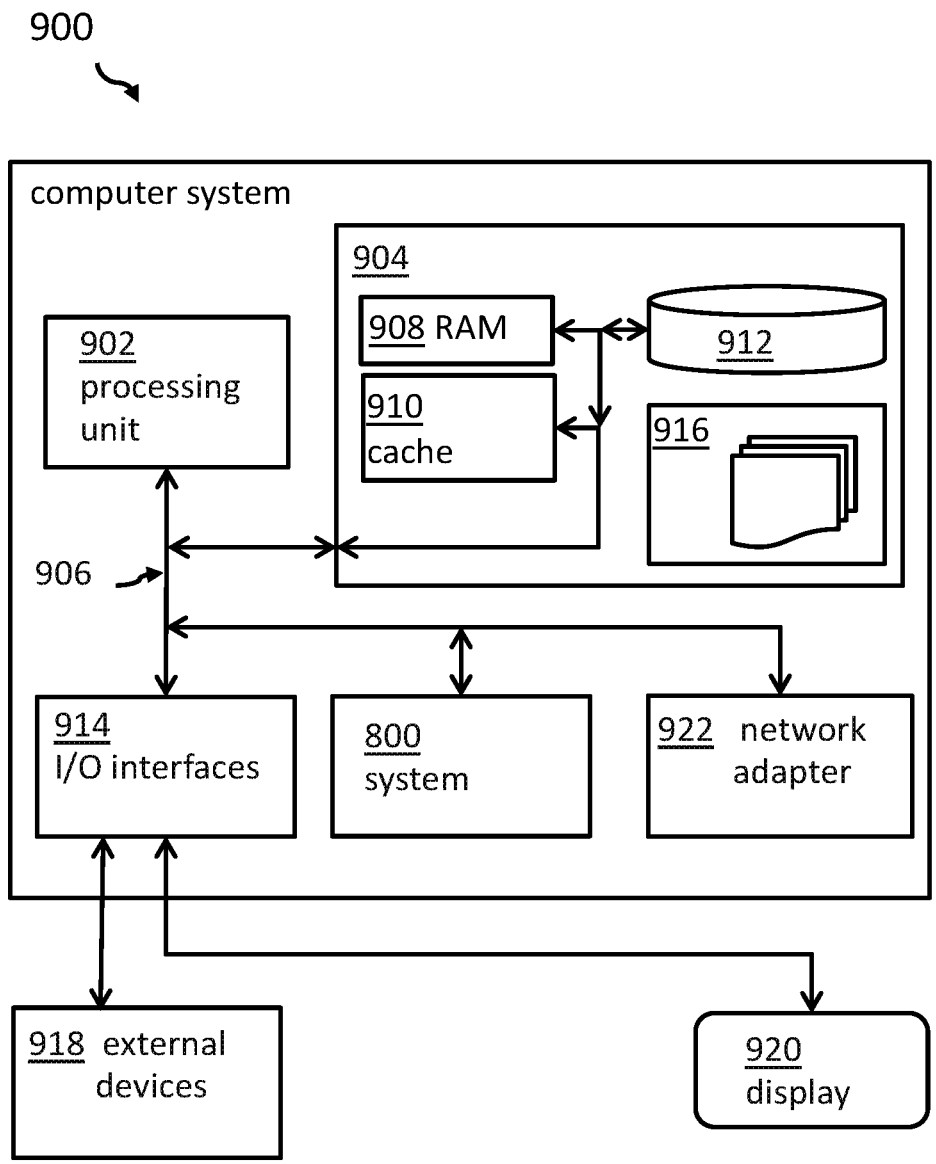

Preferred embodiments of the invention will be described, by way of example only, and with reference to the following drawings:

FIG. 1 is a flowchart showing a method for ransomware detection using snapshot-based backups applied to a block-oriented storage device, according to an embodiment of the present invention;

FIG. 2 is a block diagram view of a proposed backup architecture, according to an embodiment of the present invention;

FIG. 3 is a flowchart showing a method performed by a snapshot managing module, according to an embodiment of the present invention;

FIG. 4 is a flowchart showing a method performed by a change tracking module, according to an embodiment of the present invention;

FIG. 5 is a flowchart showing a method performed by a repair module, according to an embodiment of the present invention;

FIG. 6 depicts a snapshot malware index table, according to an embodiment of the present invention;

FIG. 7 depicts a commit table at time T_13, according to an embodiment of the present invention;

FIG. 8 is a block diagram view of a ransomware detection system, according to an embodiment of the present invention; and FIG. 9 is a block diagram view of a computing system comprising the ransomware detection system of FIG. 8, according to an embodiment of the present invention.

DETAILED DESCRIPTION

Embodiments of the present invention recognize that, in the field of ransomware detection and mitigation, modern backup software can detect whether the backup rates or the deduplication rates in a filesystem backup differ from normal processing. However, this detection typically happens at the time of a next backup, after the filesystem has already been fully infected. This means that all files in the filesystem have already been encrypted and are no longer accessible by the owner. A restore of the full filesystem can have a significant high recovery time objective (RTO) depending on the amount of data. Another downside is that changes between the last "good backup" (i.e., uncorrupted backup) and the current one are lost when restoring the backup data.

Modern snapshot-based backup software uses periodically taken snapshots to prevent data from logical errors such as ransomware attacks. A revert to a snapshot recovers all of the data, but requires that the user knows exactly when the ransomware began infecting the system. Another downside is that all changes after the last good snapshot are lost when reverting to the old snapshot.

Modern ransomware detection software allows users to define a directory/application relationship that allows data modification in given directories only for certain registered applications. However, this method may introduce a significant inflexibility for the user and the usage of the data.

Embodiments of the present invention recognize that none of the known technologies enable sufficiently precise monitoring to reliably detect ransomware early in the damage chain.

In the context of this description, the following conventions, terms and/or expressions may be used:

The term 'and/or' denotes an inclusive or; for example, A, B, "and/or" C means that at least one of A or B or C is true and applicable.

The term 'ransomware' may denote a type of malware from cryptovirology that threatens to publish the victim's data or perpetually blocks access to it unless a ransom is paid. While some simple ransomware may lock the system in a way which is not difficult for a knowledgeable person to reverse, more advanced malware may use a technique, called cryptoviral extortion, in which it may encrypt the victim's files, making them inaccessible, and may demand a ransom payment to decrypt them.

The term 'ransomware detection' may denote a mechanism to identify active or passive ransomware in a given computing system by a ransomware detection system executing a related method. The term 'ransomware mitigation' may denote a mechanism to repair or recover files that have been affected by active or passive ransomware in such a computing system.

The term 'block-oriented storage device' may denote, e.g., storage disk, e.g., in form of a spinning disk, a solid-state disk (SDD) or any other form of storage, in which the data are stored in blocks of data of a fixed and predefined length.

The term 'backup'—in particular, backup software—may denote software and/or a software/hardware combination allowing to persistently archive data using a typical data protection environment based on a client/server architecture. The backup server may administer the common backup storage resources, such as disk storage and/or tape storage, which may be used to store the backup data of client machines. The backup server may use tables (e.g., managed in a database) for storing metadata and statistical information about the backup clients and the common storage.

In this context, backup clients may typically be installed on one (or in a cluster environment on multiple) compute node(s) with access to the snapshotted environment. The backup client may read the data from the snapshotted environment that may be mounted to the computer node(s) and may send the changed data to the backup server.

The term 'snapshot'—or snapshot backup—may relate to a method to backing up and restore data by using advanced snapshot technologies and systems. Backup operations may be based on volume-level copy operations that may be provided by the storage system. To avoid unwanted downtime, the data set may be frozen at the point in time and may allow applications to continue writing to the data. The initial snapshot may be taken of a then current data set, and subsequence snapshots may copy the changed data only. A system of pointers may be used to reference the initial snapshot. This method of pointer-based snapshots may consume less disk space if compared to a situation in which the data set will be cloned repeatedly.

The term 'interval malware index value' may denote a numerical value indicative of a characteristic of an amount of data which may be determined for a given and predetermined time interval, e.g., one minute (any other time interval may also be used between two snapshot backups of the related data) based, e.g., at least in part, on a number of changed blocks of the data.

The term 'changed block rate' may denote an absolute number of blocks that have been changed in a predefined time period.

The term 'emergency snapshot' may denote a snapshot backup which may be generated just after a ransomware attack may have been identified. It may allow minimizing the number of affected blocks by the ransomware.

The term 'commit table' may denote a table—e.g., in a database or filesystem—comprising commit table entries which may denote a numerical indicator (integer value) of a commit for an entry in the filesystem, i.e., on the block storage device.

The term 'compression rate' may denote the absolute number of data compression events being performed in a given time period.

The term 'deduplication rate' may denote the absolute number of data deduplication events being performed in a given time period.

The proposed computer-implemented method for ransomware detection using regular snapshot-based backups applied to a block-oriented storage device may offer multiple advantages, contributions and technical effects:

Some embodiments of the present invention recognize the following facts, potential problems and/or potential areas for improvement with respect to the current state of the art: (i) using ransomware detection software may result in inflexibility of the usage of data due to the chosen directory/application relationship; (ii) when using modern backup software, the ransomware attack may only be detected after the filesystem was already encrypted; (iii) a full filesystem recovery from backup via restore may imply a comparable high RTO, and one may lose recently changed data; and (iv) in case of using snapshot-based backups software, a ransomware attack may only be detected after the filesystem has already been encrypted (again, one may lose recently changed data).

In contrast, methods according to embodiments of the present invention may allow an automatic and immediate detection of ransomware attacks independently from operating systems, applications, and/or directories using changed block tracking.

Moreover, the proposed methods and systems according to embodiments of the present invention may also allow an automatic and immediate reaction by creating an "out of sequence" snapshot—i.e., an emergency snapshot—to protect recently changed data from encryption by the ransomware.

Furthermore, in some embodiments, it may be possible to mitigate ransomware by automatically and immediately repairing nearly all attacked data—i.e., all data encrypted by the ransomware—from multiple snapshots and reverts.

Thus, the technology described herein may build a very good protection shield against ransomware. Signatures from known ransomware are not required. For example, in some embodiments, the method may only rely on the results produced by the ransomware independent of its origin and independent of the type of encryption used.

In the following, additional embodiments—applicable to the method as well as to the related system—will be described:

According to an advantageous embodiment, the method may also comprise storing blocks being changed—i.e., change blocks—in a commit table after a snapshot backup, continuously. In this context, the term continuously may denote that each time a block is changed it will also be stored at that very moment, or very soon thereafter. Thus, every time a change to a block of the filesystem may happen—in particular, independently of the time between the last snapshot and the current block change—the block may be stored in its current form, i.e., in the form before the block may be changed. This may allow reconstructing the performed changes over time, and thus reconstructing all changes to a block after a snapshot to a point in time just before the ransomware attack. Hence, the risk to lose data may be compressed to a minimum.

According to another advantageous embodiment, the method may also comprise determining the rate of the changed blocks after each predefined fraction of time between two subsequent snapshot backups, and using the rate of the changed blocks as the snapshot malware index value. The predefined fractions of time may be customizable for a given implementation. It may be, e.g., every couple of seconds, every half minute, every minute, every two-minutes, every five minutes, and so on. The time interval may also be dependent on the type of data for which protection is planned.

According to another advantageous embodiment, the method may also comprise deleting the stored changed blocks in the commit table after a new snapshot backup is performed. Thus, the data being backed up in the snapshot does not require more storage space than necessary (e.g., in the snapshot backup storage and in the commit table). Additionally, it may no longer be necessary to have a fully historic reconstruction of the sequence of all changes. Therefore, storage space may be saved in order to allow a higher performance.

According to another advantageous embodiment, the method may also comprise storing the interval malware index value persistently (e.g., in persistent storage). With this, a sequence of historical data of the interval malware index value may be built in order to make longer-term analysis of the interval malware index so that longer-term comparisons may be performed.

According to an embodiment, the method may also comprise triggering an alarm signal upon triggering an emergency snapshot. This may be used to inform the user about a potential ransomware attack. The signal may also be used to take action stopping the encryption by the ransomware process in the operating system relating to the ransomware software.

According to an embodiment, the method may also comprise pausing the determination of the at least one interval malware index value—and subsequently also all consequences—if a predefined condition is met. A flag for a predefined condition may be set by a user, e.g., if the user wants to manually encrypt a larger portion of the filesystem or if it is planned to copy large amounts of data from one location in the filesystem to another.

If such a flag is not set, the interval malware index may have a too high value and the method may conclude that ransomware software is present which may also result in the now unwanted emergency snapshot backup. The above-described feature may avoid such a situation.

According to an embodiment, the method may also comprise repairing an unwillingly encrypted file—in particular one which has already been attacked by ransomware software—using unencrypted data blocks from previously taken snapshot backups and stored changed block from the commit table from a time before the emergency snapshot backup was triggered. Consequently, a ransomware attack loses its frightening character because more or less every block of the filesystem may be recoverable, even if the ransomware software may have attacked files already.

According to an embodiment, the method may also comprise deleting a snapshot having on older version than the current snapshot backup. The difference between the current version and the older version may be adjustable. Hence, the system may only delete, e.g., version "current version—3" or "current version—2". Such a parameter may be configurable in a specific implementation of the here proposed method and system. This feature may allow not overburdening existing storage systems with too old and no longer useful snapshot backup versions, and may help to save valuable storage space.

According to an embodiment of the method, the snapshot malware index value SMI may be determined as:

$$SMI=(1+DeltaChange)*(1-DeltaComp)*(1-DeltaDedup)$$

In this embodiment, DeltaChange is a block change rate of a current snapshot minus an average block change rate of a predefined plurality of earlier snapshot backups, DeltaComp is is a compression rate of a current snapshot minus an average compression rate of the predefined plurality of earlier snapshot backups, and DeltaDedup is a deduplication rate of a current snapshot minus an average deduplication rate of the predefined plurality of earlier snapshot backups.

It may be noted that the above-described formula may represent only one example for a determination of the snapshot malware index. Many others may exist. For example, the formula may also allow using other variables such as the decompression rate of a current snapshot if compared to an average compression rate, as well as a current deduplication rate in comparison to an average deduplication rate. Hence, the proposed method may not only find its orientation based on only one measured value (the number of blocks changed per time period), but also on additionally available data which may be a side product of taking the snapshot.

In the following, a detailed description of the figures will be given. All instructions in the figures are schematic. Firstly, a block diagram of an embodiment of the computer-implemented method for ransomware detection using regular snapshot-based backups applied to a block-oriented storage device is given. Afterwards, further embodiments, as well as embodiments of the ransomware detection system using regular snapshot-based backups applied to a block-oriented storage device, will be described.

FIG. 1 is a flowchart showing a method 100 for ransomware detection using snapshot-based backups applied to a block-oriented storage device, according to an embodiment of the present invention. The method comprises performing, 102, a snapshot backup of data of the block-oriented storage device in predetermined time-intervals. This creates a new entry in the SMITa (snapshot malware index table).

Furthermore, the method 100 comprises determining, 104, at least one interval malware index value—typically many more between two snapshot backups—between a last snapshot backup and a next planned snapshot backup. The interval malware index value is indicative of a changed block rate in the stored data of storage blocks of the block-oriented storage device. This may happen continuously, i.e., at small predefined time intervals, e.g., 100 times between two snapshots (the value may be configurable). The rate may be normalized to the time interval chosen.

Additionally, the method 100 further comprises: upon determining, 106, that the snapshot malware index value is larger than a predefined snapshot malware index threshold value—e.g., based on some historical snapshot and typical block change rates for the type of data—triggering, 108, an emergency snapshot. Hence, the predefined snapshot malware index threshold value may also be adjusted to the type of data, e.g., metadata that only changes rarely, transaction data of an e-commerce shop that may change very often, etc.

FIG. 2 is a block diagram view of a proposed backup architecture 200, according to an embodiment of the present invention. The backup client 202 runs on a compute node 204. The compute node 204 has a local mount on the snapshotted environment 206 and has access to the snapshot disk components, such as hard disks 208, 210, 212. The snapshotted environment 206 and its corresponding snapshots are controlled by a snapshot manager tool or module. The backup client 202 is connected to the backend server 214.

In order to get a comprehensive understanding of the concept described herein, it may be worthwhile consider existing backup software with ransomware detection, where the way to protect data is to perform frequent backups. This will allow the restore of the last backup comprising non-encrypted data. Up until now, this was the only way which to ensure the recovery of uncorrupted data.

In some existing systems, a backup application identifies ransomware activity by analyzing the data stream of the data as part of the backup process. While the backup is running, the snapshot data being backed up is analyzed for already performed data encryption in order to detect if the current backup content is already infected by ransomware software. If the backup is infected it is recognized as bad backup. So, the owner of a snapshotted environment discovers the malware attack after a backup has been initialized and after the files been encrypted, which is too late. The detection happens at the time of the next backup after the snapshotted environment was infected, what means that at the time of discovery, the data is already encrypted. Therefore, to repair infected files, a full restore of the filesystem has to be done.

Referring back to FIG. 2, snapshots may be stored, e.g., as snapshot 216 and 218 on the set of hard disks 208.

FIG. 2 also shows additional components which are not part of a standard backup architecture, as discussed above. The enhanced snapshot backup system 220 may control the functioning and the activities of: the snapshot management module (SMM) 222 that performs taking the snapshots and maintains a snapshot malware index table (SMITa); the change tracking module (CTM) 224 that performs the change block tracking and maintains a committed table (CT); and the repair module (RM) 226. The functioning of these modules will be explained in the context of related flowcharts in the following three figures.

FIG. 3 is a flowchart showing a method 300 performed by a snapshot managing module (SMM), according to an embodiment of the present invention. The process starts at 302. Next, a snapshot is created and an entry is made, 304, to the snapshot malware index table SMITa. Then the change tracking module (CTM) is informed, 306, about the snapshot. It is determined, 308, whether an older snapshot may be deleted. If that is not the case—case "N"—the snapshot malware index (SMI) will be monitored, 310, in short and/or longer intervals. Next, it is determined, 312, whether the SMI is larger than the snapshot malware index threshold (SMITh) value. If that is not the case—case "N"—it will be determined, 314, whether the snapshot interval is exceeded, 314. If that is not the case (case "N"), the process returns back to the monitoring of the snapshot malware index in short intervals, 310.

If, on the other hand, the snapshot malware index (SMI) is larger than a related threshold value (SMITh)—case "Y" at 312—an alert is generated and sent and a snapshot is triggered, 316. After that, the SMM is stopped, 318, until a repair process of already infected blocks is completed.

Referring back to determination 308, whether an older snapshot may be deleted—case "Y" at 308—the obsolete snapshot(s) is/are deleted, 320. Additionally, entries for deleted snapshots are removed, 322, from the snapshot malware index table (SMITa). Additionally, the change tracking module (CTM) is informed, 324. The process continues with the monitoring 310 of the SMI in the defined short intervals.

The functioning of the snapshot managing module may also be described as follows:

After a predefined time interval (such as every hour, or less), the SMM creates a snapshot (e.g., snapshot Sn_X) and records this snapshot in the snapshot malware index table (SMITa). Then, the SMM informs the change tracking module (CTM) about the new snapshot. The change tracking module (CTM) continuously performs live change block tracking on the volumes that contain the filesystem. For a current snapshot, it creates an entry (new row) in the commit table (CT), called commit table entry (CTE) and fills it with the number of changed blocks until the next snapshot is taken. With every change recorded (or after a configurable short time interval like, e.g., 5 min.), the SMI is calculated (see next figure).

Now, and in parallel, the CTM determines (with every change recorded) the difference of a number of changed blocks in the predefined time interval of taking snapshots (see above). That is, the CTM determines the DeltaChange, DeltaComp and DeltaDedup, e.g., for the last hour. From these values it determines the snapshot malware index SMI (for an exemplary algorithm, see below). The SMI is updated in the SMITa in the row related to the current snapshot so that the SMM can use this value for alerting (see next step).

The following formulas may be used. In this example embodiment, two additional snapshots are preserved:

$$SMI=(1+DeltaChange)*(1-DeltaComp)*(1-DeltaDedup)$$

In this example embodiment, DeltaChange is the change rate of current snapshot minus the average change rate of the last Y snapshots. [ChR=Change Rate]. DeltaChange may be calculated according to the following example formula, which is used for Table 1 (see FIG. 6, discussed below):

$$DeltaChange=(ChR\ of\ Sn\_X)-((ChR\ of\ Sn\_X-2)+(ChR\ of\ Sn\_X-1))/2$$

In this example embodiment, DeltaComp is the compression rate of current snapshot minus the average compression rate of the last Y snapshots. [CoR=Compression Rate]. DeltaComp may be calculated according to the following example formula, which is also used for Table 1 (see FIG. 6, discussed below):

$$DeltaComp=(CoR\ of\ Sn\_X)-((CoR\ of\ Sn\_X-2)+(CoR\ of\ Sn\_X-1))/2.$$

In this example embodiment, DeltaDedup is the deduplication rate of current snapshot minus the average deduplication rate of the last Y snapshots. [DeR=Deduplication Rate]. DeltaDedup may be calculated according to the following example formula, which again, is also used for Table 1 (see FIG. 6, discussed below):

$$DeltaDedup=(DeR\ of\ Sn\_X)-((DeR\ of\ Sn\_X-2)+(DeR\ of\ Sn\_X-1))/2.$$

Then, in a next step, the SMM sends an alert if the SMI exceeds the snapshot malware index threshold (SMITh), and if no alert exists and all repairs are done, the SMM deletes snapshots older than a certain time (e.g., Sn_[X−3], which means that two additional snapshots are kept). Then, the SMM removes entries for deleted snapshots from SMITa; and the SMM informs the CTM to remove entries for deleted snapshots from commit table CT (see Table 2 in FIG. 7, discussed below).

FIG. 4 is a flowchart showing a method 400 performed by a change tracking module (CTM), according to an embodiment of the present invention. This process starts at 402. Next, changes in the filesystem—in particular in the blocks of the filesystem—are monitored, 404. Then, a series of determinations follow: Firstly, it is determined, 406, whether a new commit is required (e.g., based on an end of a predetermined time period). If that is the case—case "Y"—the required commit table entry (CTE) is determined and added, 408, for commit to the commit table (CT).

If that is not the case—case "N" in 406—it is determined, 410, whether a new snapshot is required. If that is the case—case "Y"—the commit malware index (CMI) of the commit table entries (CTE) from the last snapshot is determined, 412. Then, a commit may be marked, 414, as potentially affected if the CMI is, e.g., above 1.

The process continues now, as well as after a negative determination 410 about a new snapshot, with a determination 416 whether a snapshot may be deleted. If that is the case—case "Y"—the commit table entries (CTE) for the deleted snapshot are removed, 418, from the commit table (CTE). Then, the process continues with a continuous loop 420 bringing the process back to the monitoring of changes in the filesystem 404.

The functioning of the change tracking module may also be described as follows:

The CTM adds a commit table entry (CTE) for all commits to the commit table (CT). A CTE comprises the snapshot, the commit number, the blocks written, the commit compress rate and the commit deduplication rate.

When the CTM is informed by the SMM that a new snapshot was created, it determines the commit malware index (CMI) of the CTEs from the last snapshot according to the following formula:

$$CMI = (CoR\_Snapshot - CoR\_Commit) + (DeR\_Snapshot - DeR\_commit)$$

In this example embodiment, CoR_Snapshot is the compression rate of the snapshot from the SMITa, CoR_Commit is the compression rate of all blocks in the specific commit, DeR_Snapshot is the deduplication rate of the snapshot from the SMITa, and DeR_Commit is the deduplication rate of all blocks of the specific commit.

Finally, the CTM marks a commit as potentially affected by a malware attack when the CMI is above, e.g., 1.

FIG. 5 is a flowchart showing a method 500 performed by a repair module (RM), according to an embodiment of the present invention. The RM may become active after a ransomware attack has been detected and a repair of certain files in the filesystem is required.

The process and repair phase starts at 502 and continues with picking the newest and latest snapshot backup 504. The process continues with finding, 506, the newest commit table entry (CTE) in the commit table (CT) of this snapshot. The CTE is analyzed, 508, whether it is affected. If that is the case—case "Y"—the process continues with looking for blocks of commit table entries in the order of snapshots (in a sequence from new to old) which are not affected, 510. Based on this, the respective blocks are replaced in the filesystem, 512. Next, it is determined, 514, whether all blocks have been replaced. If that is not the case, it may be determined whether there is a logging problem, 516.

After this or, after all blocks have been replaced—case "Y" in determination 514—the process continues with a determination 518 whether more commit table entries are in this snapshot. If that is the case—case "Y"—the process continues, 520, with the next older commit table entry in the commit table for this snapshot. Otherwise—case "N"—it is determined, 522, whether more snapshots exist. If that is not the case, the process may end, 524.

However, if more snapshots exist—case "Y" in determination 522—the process continues, 526, with the next older snapshot. After this, the process returns to the step of finding the newest commit table entry in the commit table for this snapshot, 506. The process runs as long as there are blocks to be repaired. After the repair phase, the ransomware detection system may return back to normal operations.

The functioning of the repair module may also be described as follows:

The RM is invoked by the system administrator, when (a) the system administrator has identified the SMI exceeding the SMIT being a result of a malware attack, or (b) the attack is stopped.

Starting repair by the RM: The RM identifies a next snapshot to repair; it starts with newest (i.e., Sn_13, then Sn_12, . . . ). Then, (A) the RM searches in the CT for the last affected commit in the snapshot and identifies in the CT for this snapshot the newest affected commit. In the example from Table 2 (see FIG. 7), the newest affected commit is commit number #1252 with blocks 17, 18, 22 (and then #1249, #1248; marked with bold frames).

Next, the RM searches in the CT from new to old snapshot for the blocks of this commit when they are not affected. In the example from Table 2, this is Sn_10 with commit #1237. The RM replaces the affected blocks (of commit #1252) with blocks from that commit (i.e., #1237) and repeats with the step "The RM searches in the CT for the last affected commit in the snapshot" (see above, A) until all commits from this snapshot are repaired. The RM then loops back to the step just described with the next snapshot to be repaired.

The result of the repairs in the example from Table 2 (see FIG. 7) are: commits #1252, #1249, #1248, #1246, and #1243 (marked with bold frames) are replaced with commits #1237, #1238, #1235, #1240, and #1234, respectively.

Commit #1245 cannot be repaired. This is an example where alternate protection methods may be applied, such as backups.

Finally, the RM informs the administrator that the recovery is complete. As a result, the alert can be cleared and the SMM can delete the old obsolete snapshots again.

FIG. 6 depicts snapshot malware index table (SMITa), also referred to as Table 1, according to an embodiment of the present invention. It should be noted that for simplification reasons, the SMITa comprises only one entry for each snapshot cycle. This would reflect a defined time period (DTP) of 100%. With a defined time period of 50%, each snapshot would have two recordings. With a defined time period of 1%, each snapshot would have 100 recordings. The quality of the malware detection increases with the decreased defined time period.

As an example, the following may be considered: with a DTP of 100%, the currently detected SMI can be compared only against the SMITh of the descending snapshot. Assuming a snapshot is taken every 100 minutes, in minute 1 after the descending snapshot the minute 1 SMITh is compared to the 100 minutes average SMITh from the descending snapshot-snapshot cycle. As a result, an exceeding of the threshold may be detected very late in the current cycle.

With a DTP of 1%, the currently detected SMI can be compared against the SMITh from minute 1 of the descending snapshot cycle. This will allow more granular detection of a potentially exceeded SMITh.

FIG. 7 depicts an exemplary commit table at time T_13, also referred to as Table 2, according to an embodiment of the present invention. The commit entries marked as affected ("YES") are shown with a bold cell frame.

FIG. 8 is a block diagram view of a ransomware detection system 800, according to an embodiment of the present invention. The ransomware detection system comprises at least backup means—in particular a backup module 802 (potentially a combination of the backup client and the backup server, see FIG. 2)—adapted for performing a snapshot backup of data of the block-oriented storage device in predetermined time-intervals.

Additionally, the ransomware protection system 800 also comprises determining means—in particular the change tracking module 224 (see also, FIG. 2) adapted for determining at least one interval malware index value between a last snapshot backup and a next planned snapshot backup. Thereby, the interval malware index value is indicative of a changed block rate in the stored data of storage blocks of the block-oriented storage device.

Furthermore, the ransomware detection system comprises triggering means—in particular a trigger unit 804 (potentially a component of the change tracking module, CTM)—adapted for triggering an emergency snapshot if it is determined that the snapshot malware index value is larger than a predefined snapshot malware index threshold value.

It may also be noted that the backup module 802, change tracking module 224, and the trigger unit 804 are electrically connected via signal line or may, alternatively, be electrically connected to a ransomware detection system internal bus system 806.

Furthermore, additional modules may be also connected to internal bus system 806, e.g., the above-mentioned snapshot managing module (SMM), and the repair module (both not shown in FIG. 8).

Embodiments of the invention may be implemented together with virtually any type of computer, regardless of the platform being suitable for storing and/or executing program code. FIG. 9 shows, as an example, a block diagram view of a computing system 900 suitable for executing program code related to the proposed method.

The computing system 900 is only one example of a suitable computer system, and is not intended to suggest any limitation as to the scope of use or functionality of embodiments of the invention described herein. The computing system 900 is capable of being implemented for performing any of the functionality set forth hereinabove. In the computer system 900, there are components, which are operational with numerous other general purpose or special purpose computing system environments or configurations. Examples of well-known computing systems, environments, and/or configurations that may be suitable for use with computer system/server 900 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 900 may be described in the general context of computer system-executable instructions, such as program modules, being executed by a computer system 900. Generally, program modules may include routines, programs, objects, components, logic, data structures, and so on that perform particular tasks or implement particular abstract data types. Computer system/server 900 may be practiced in distributed cloud computing environments where tasks are performed by remote processing devices that are linked through a communications network. In a distributed cloud computing environment, program modules may be located in both, local and remote computer system storage media, including memory storage devices.

As shown in FIG. 9, computer system/server 900 is shown in the form of a general-purpose computing device. The components of computer system/server 900 may include, but are not limited to, one or more processors or processing units 902, a system memory 904, and a bus 906 that couple various system components including system memory 904 to the processor 902. Bus 906 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 900 typically includes a variety of computer system readable media. Such media may be any available media that is accessible by computer system/server 900, and it includes both, volatile and non-volatile media, removable and non-removable media.

The system memory 904 may include computer system readable media in the form of volatile memory, such as random access memory (RAM) 908 and/or cache memory 910. Computer system/server 900 may further include other removable/non-removable, volatile/non-volatile computer system storage media. By way of example only, a storage system 912 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 906 by one or more data media interfaces. As will be further depicted and described below, memory 904 may include at least one program product having a set (e.g., at least one) of program modules that are configured to carry out the functions of embodiments of the invention.

The program/utility, having a set (at least one) of program modules 916, may be stored in memory 904 by way of example, and not limiting, as well as an operating system, one or more application programs, other program modules, and program data. Each of the operating systems, one or more application programs, other program modules, and program data or some combination thereof, may include an implementation of a networking environment. Program modules 916 generally carry out the functions and/or methodologies of embodiments of the invention, as described herein.

The computer system/server 900 may also communicate with one or more external devices 918 such as a keyboard, a pointing device, a display 920, etc.; one or more devices that enable a user to interact with computer system/server 900; and/or any devices (e.g., network card, modem, etc.) that enable computer system/server 900 to communicate with one or more other computing devices. Such communication can occur via Input/Output (I/O) interfaces 914. Still yet, computer system/server 900 may communicate with one or more networks such as a local area network (LAN), a general wide area network (WAN), and/or a public network (e.g., the Internet) via network adapter 922. As depicted, network adapter 922 may communicate with the other components of the computer system/server 900 via bus 906. It should be understood that, although not shown, other hardware and/or software components could be used in conjunction with computer system/server 900. Examples, include, but are not limited to: microcode, device drivers, redundant processing units, external disk drive arrays, RAID systems, tape drives, and data archival storage systems, etc.

Additionally, a ransomware detection system 800 using regular snapshot-based backups applied to a block-oriented storage device may be attached to the bus system 906.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The computer readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for ransomware detection and mitigation, the method comprising:
   performing, in predetermined time intervals, snapshot backups of data in a block-oriented storage device;
   responsive to performing a first snapshot backup, storing an identification of changed data blocks in a commit table, the storing occurring prior to performing a next snapshot backup according to the predetermined time intervals;
   determining an interval malware index value indicative of a changed block rate as identified in the commit table;
   detecting ransomware based on the interval malware index value being larger than a predefined interval malware index threshold value;
   responsive to the detected ransomware, performing an emergency snapshot prior to performing the next snapshot backup according to the predetermined time intervals, the emergency snapshot being performed independent of and out of sequence with the predetermined time intervals for snapshot backups;
   in response to determining a file has been affected by the detected ransomware, repairing the file using unencrypted data blocks from the first snapshot backup, using the identification of changed data blocks stored in the commit table; and
   deleting the identification of changed data blocks in the commit table in response to a second snapshot backup being performed.

2. The computer-implemented method of claim 1, further comprising:
   determining a rate of changed data blocks between at least two snapshot backups of the performed snapshot backups;
   wherein:
   determining the interval malware index value is based, at least in part, on the determined rate of changed data blocks.

3. The computer-implemented method of claim 1, further comprising:
   storing the interval malware index value in persistent storage.

4. The computer-implemented method of claim 1, further comprising:
   in response to performing the emergency snapshot, triggering an alarm signal.

5. The computer-implemented method of claim 1, further comprising:
   in response to determining that a predefined condition is met, pausing the determination of the interval malware index value.

6. The computer-implemented method of claim 1, further comprising:
   determining a previous snapshot backup is older than the first snapshot backup by a predetermined number of backups, and
   deleting the previous snapshot backup.

7. The computer-implemented method of claim 1, wherein the interval malware index value is determined based, at least in part, on the following formula:

$$(1+\text{DeltaChange})*(1-\text{DeltaComp})*(1-\text{DeltaDedup}),$$

wherein:
DeltaChange is a block change rate of a current snapshot backup minus an average block change rate of a predefined plurality of earlier snapshot backups,
DeltaComp is a compression rate of the current snapshot backup minus an average compression rate of the predefined plurality of earlier snapshot backups, and
DeltaDedup is a deduplication rate of the current snapshot backup minus an average deduplication rate of the predefined plurality of earlier snapshot backups.

8. A computer program product for ransomware detection and mitigation, the computer program product comprising one or more computer readable storage media and program instructions collectively stored on the one or more computer readable storage media, the stored program instructions comprising:
   program instructions to perform, in predetermined time intervals, snapshot backups of data in a block-oriented storage device;
   program instructions to, in response to performing a first snapshot backup, store an identification of changed data blocks in a commit table, the storing occurring prior to performing a next snapshot backup according to the predetermined time intervals;
   program instructions to determine an interval malware index value indicative of a changed block rate as identified in the commit table;

program instructions to detect ransomware based on the interval malware index value being larger than a predefined interval malware index threshold value;
program instructions to, in response to the detected ransomware, perform an emergency snapshot prior to performing the next snapshot backup according to the predetermined time intervals, the emergency snapshot being performed independent of and out of sequence with the predetermined time intervals for snapshot backups;
program instructions to, in response to determining a file has been affected by the detected ransomware, repair the file using unencrypted data blocks from the first snapshot backup, using the identification of changed data blocks stored in the commit table;
program instructions to delete the identification of changed data blocks in the commit table in response to a second snapshot backup being performed.

9. The computer program product of claim 8, the stored program instructions further comprising:
program instructions to determine a rate of changed data blocks between at least two snapshot backups of the performed snapshot backups;
wherein:
determining the interval malware index value is based, at least in part, on the determined rate of changed data blocks.

10. The computer program product of claim 8, the stored program instructions further comprising:
program instructions to store the interval malware index value in persistent storage.

11. The computer program product of claim 8, the stored program instructions further comprising:
program instructions to, in response to performing the emergency snapshot, trigger an alarm signal.

12. The computer program product of claim 8, the stored program instructions further comprising:
program instructions to, in response to determining that a predefined condition is met, pause the determination of the interval malware index value.

13. The computer program product of claim 8, the stored program instructions further comprising:
program instructions to determine a previous snapshot backup is older than the first snapshot backup by a predetermined number of backups, and
program instructions to delete the previous snapshot backup.

14. A computer system for ransomware detection and mitigation, the computer system comprising:
a processor(s) set; and
a computer readable storage medium;
wherein:
the processor(s) set is structured, located, connected and/or programmed to run program instructions stored on the computer readable storage medium; and
the stored program instructions comprising:
program instructions to perform, in predetermined time intervals, snapshot backups of data in a block-oriented storage device,
program instructions to, in response to performing a first snapshot backup, store an identification of changed data blocks in a commit table, the storing occurring prior to performing a next snapshot backup according to the predetermined time intervals,
program instructions to determine an interval malware index value indicative of a changed block rate as identified in the commit table,
program instructions to detect ransomware based on the interval malware index value being larger than a predefined interval malware index threshold value,
program instructions to, in response to the detected ransomware, perform an emergency snapshot prior to performing the next snapshot backup according to the predetermined time intervals, the emergency snapshot being performed independent of and out of sequence with the predetermined time intervals for snapshot backups,
program instructions to, in response to determining a file has been affected by the detected ransomware, repair the file using unencrypted data blocks from the first snapshot backup, using the identification of changed data blocks stored in the commit table, and
program instructions to delete the identification of changed data blocks in the commit table in response to a second snapshot backup being performed.

15. The computer system of claim 14, the stored program instructions further comprising:
program instructions to determine a rate of changed data blocks between at least two snapshot backups of the performed snapshot backups;
wherein:
determining the interval malware index value is based, at least in part, on the determined rate of changed data blocks.

16. The computer system of claim 14, the stored program instructions further comprising:
program instructions to store the interval malware index value in persistent storage.

17. The computer system of claim 14, the stored program instructions further comprising:
program instructions to, in response to performing the emergency snapshot, trigger an alarm signal.

18. The computer system of claim 14, the stored program instructions further comprising:
program instructions to, in response to determining that a predefined condition is met, pause the determination of the interval malware index value.

19. The computer system of claim 14, the stored program instructions further comprising:
program instructions to determine a previous snapshot backup is older than the first snapshot backup by a predetermined number of backups, and
program instructions to delete the previous snapshot backup.

\* \* \* \* \*